(12) United States Patent
Nelson et al.

(10) Patent No.: US 12,612,876 B2
(45) Date of Patent: Apr. 28, 2026

(54) ALTERNATE LUBRICATION MECHANISM FOR VEHICLE BEARINGS

(71) Applicant: RTX Corporation, Farmington, CT (US)

(72) Inventors: Alexander Robert Nelson, Amston, CT (US); Brady L. Walker, Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/433,578

(22) Filed: Feb. 6, 2024

(65) Prior Publication Data

US 2025/0250935 A1 Aug. 7, 2025

(51) Int. Cl.
*F02C 7/06* (2006.01)
*F16C 33/66* (2006.01)

(52) U.S. Cl.
CPC ............ *F02C 7/06* (2013.01); *F16C 33/6681* (2013.01); *F05D 2240/50* (2013.01); *F05D 2260/98* (2013.01); *F16C 2360/23* (2013.01); *F16N 2210/14* (2013.01)

(58) Field of Classification Search
CPC .... F05D 2240/50; F05D 2260/98; F02C 7/06; F16C 33/6681; F16C 2360/23; F16N 2210/14
USPC .................................................. 474/11.1, 13.1
See application file for complete search history.

(56) References Cited

U.S. PATENT DOCUMENTS

| | | | | |
|---|---|---|---|---|
| 3,144,097 | A * | 8/1964 | Ebert | F16N 7/26 |
| | | | | 261/92 |
| 4,466,508 | A * | 8/1984 | Buse | F16C 33/6659 |
| | | | | 184/13.1 |
| 5,328,275 | A | 7/1994 | Winn | |
| 5,499,901 | A * | 3/1996 | Rockwood | F04D 29/061 |
| | | | | 415/230 |
| 5,513,964 | A * | 5/1996 | Rockwood | F16N 7/16 |
| | | | | 417/423.13 |
| 5,591,020 | A * | 1/1997 | Rockwood | B05D 7/00 |
| | | | | 417/423.12 |
| 5,647,735 | A | 7/1997 | Rockwood | |
| 6,008,557 | A * | 12/1999 | Dornhoefer | H02K 5/1672 |
| | | | | 310/90 |
| 6,460,656 | B1 * | 10/2002 | Jones, Jr. | F16C 33/664 |
| | | | | 184/13.1 |
| 6,913,438 | B2 | 7/2005 | Rockwood | |
| 10,288,081 | B1 * | 5/2019 | Maxwell, III | F04D 13/021 |
| 10,837,447 | B2 * | 11/2020 | Kimura | F16C 33/6659 |
| 12,228,042 | B1 * | 2/2025 | Miller | F02C 7/06 |
| 2006/0054415 | A1 * | 3/2006 | Buhlmaier | F16H 57/0427 |
| | | | | 184/11.1 |
| 2011/0085753 | A1 * | 4/2011 | Tecza | F16C 35/077 |
| | | | | 310/90.5 |
| 2016/0238135 | A1 * | 8/2016 | Clark | F01D 25/18 |

* cited by examiner

*Primary Examiner* — Anna M Momper
*Assistant Examiner* — Mark K Buse
(74) *Attorney, Agent, or Firm* — Bachman & LaPointe, P.C.

(57) ABSTRACT

A lubrication system including a bearing compartment housing; a shaft supported by bearings located within the bearing compartment housing; and a flinger in operative communication with the shaft, the flinger configured to propel at least one of a lubricant, air and a mist of lubricant entrained in the air onto the bearing.

18 Claims, 3 Drawing Sheets

ALTERNATE LUBRICATION MECHANISM FOR VEHICLE BEARINGS

BACKGROUND

The present disclosure is directed to a lubrication system for bearings utilizing a lubricant slinger to suspend lubricant in air.

Some aircraft engines use fluid lubricated bearings. The lubricated bearings traditionally use lubrication systems which utilize pressurized oil and/or fuel that require parts such as supply/scavenge pumps, reservoirs, sumps, plumbing/pipes, and seals. These lubrication system components can account for up to 30% of overall propulsion system weight, volume, and cost in certain engines (e.g., small limited-life engines).

SUMMARY

In accordance with the present disclosure, there is provided a lubrication system comprising a bearing compartment housing; a shaft supported by bearings located within the bearing compartment housing; and a flinger in operative communication with the shaft, the flinger configured to propel at least one of a lubricant, air and a mist of lubricant entrained in the air onto the bearing.

A further embodiment of any of the foregoing embodiments may additionally and/or alternatively include the flinger is configured as at least one arm with at least one of a parabolic curved shape, spoon shape, or underside of an airfoil shape.

A further embodiment of any of the foregoing embodiments may additionally and/or alternatively include the flinger is integral with the shaft.

A further embodiment of any of the foregoing embodiments may additionally and/or alternatively include the flinger arm is configured in at least one of a cross shape, a double cross shape, and a mobius shape.

A further embodiment of any of the foregoing embodiments may additionally and/or alternatively include the flinger comprises a scoop shape profile configured to swirl the air and the lubricant to entrain the lubricant in the air to create a suspended lubricant in the air, and/or mist of lubricant in the air.

A further embodiment of any of the foregoing embodiments may additionally and/or alternatively include the flinger is configured to propel the lubricant into contact with the bearings to lubricate the bearings.

A further embodiment of any of the foregoing embodiments may additionally and/or alternatively include the flinger comprises at least one arm in operative communication with the shaft.

In accordance with the present disclosure, there is provided a lubrication system comprising a gas turbine engine having a gas turbine engine housing, the gas turbine engine housing having a forward portion opposite an aft portion; a shaft mounted within the gas turbine engine housing, the shaft having an axis; a bearing compartment housing formed within the gas turbine engine housing; at least one bearing located within the bearing compartment housing supports the shaft; and at least one flinger in operative communication with the shaft, the at least one flinger configured to propel at least one of a lubricant, air and a mist of lubricant entrained in the air onto the at least one bearing.

A further embodiment of any of the foregoing embodiments may additionally and/or alternatively include the at least one flinger is configured as at least one arm with at least one of a parabolic curved shape, spoon shape, or underside of an airfoil shape.

A further embodiment of any of the foregoing embodiments may additionally and/or alternatively include the at least one arm is configured in at least one of a cross shape, a double cross shape, and a mobius shape.

A further embodiment of any of the foregoing embodiments may additionally and/or alternatively include the at least one flinger is configured to propel the lubricant into contact with the bearings to lubricate the at least one bearing.

A further embodiment of any of the foregoing embodiments may additionally and/or alternatively include the at least one flinger is integral with the shaft.

A further embodiment of any of the foregoing embodiments may additionally and/or alternatively include the at least one flinger shape is configured to contact the lubricant pooled along an interior surface of the bearing compartment housing.

In accordance with the present disclosure, there is provided a process for delivering a lubricant in a lubrication system comprising mounting a shaft within a gas turbine engine housing of a gas turbine engine having a forward portion opposite an aft portion, the shaft having an axis extending from the forward portion to the aft portion; forming a bearing compartment housing within the gas turbine engine housing, the bearing compartment housing comprising an interior surface and an exterior surface, and the bearing compartment housing being configured to house at least one bearing configured to support the shaft; coupling at least one flinger in operative communication with the shaft; and configuring the at least one flinger to propel at least one of a lubricant, air and a mist of lubricant entrained in the air onto the at least one bearing.

A further embodiment of any of the foregoing embodiments may additionally and/or alternatively include the process further comprising configuring the at least one flinger as at least one arm with at least one of a parabolic curved shape, spoon shape, or underside of an airfoil shape.

A further embodiment of any of the foregoing embodiments may additionally and/or alternatively include the process further comprising configuring the at least one arm in at least one of a cross shape, a double cross shape, and a mobius shape.

A further embodiment of any of the foregoing embodiments may additionally and/or alternatively include the process further comprising configuring the flinger with a scoop shape profile configured to swirl the air and the lubricant to entrain the lubricant in the air to create a suspended lubricant in the air, and/or mist of lubricant in the air.

A further embodiment of any of the foregoing embodiments may additionally and/or alternatively include the process further comprising configuring the at least one flinger to propel the lubricant in any phase or form, such as a liquid, a gas, a mixed phase fluid, and the like.

A further embodiment of any of the foregoing embodiments may additionally and/or alternatively include the process further comprising configuring the at least one flinger shape to contact the lubricant pooled along an interior surface of the bearing compartment housing.

A further embodiment of any of the foregoing embodiments may additionally and/or alternatively include the process further comprising forming a first flinger and a second flinger in operative communication with the shaft; configuring the first persuader to propel the lubricant in a first direction onto a first bearing; and configuring the second flinger to propel the lubricant in a second direction onto a second bearing.

Other details of the lubrication system are set forth in the following detailed description and the accompanying drawings wherein like reference numerals depict like elements.

DETAILED DESCRIPTION

Figure 1:
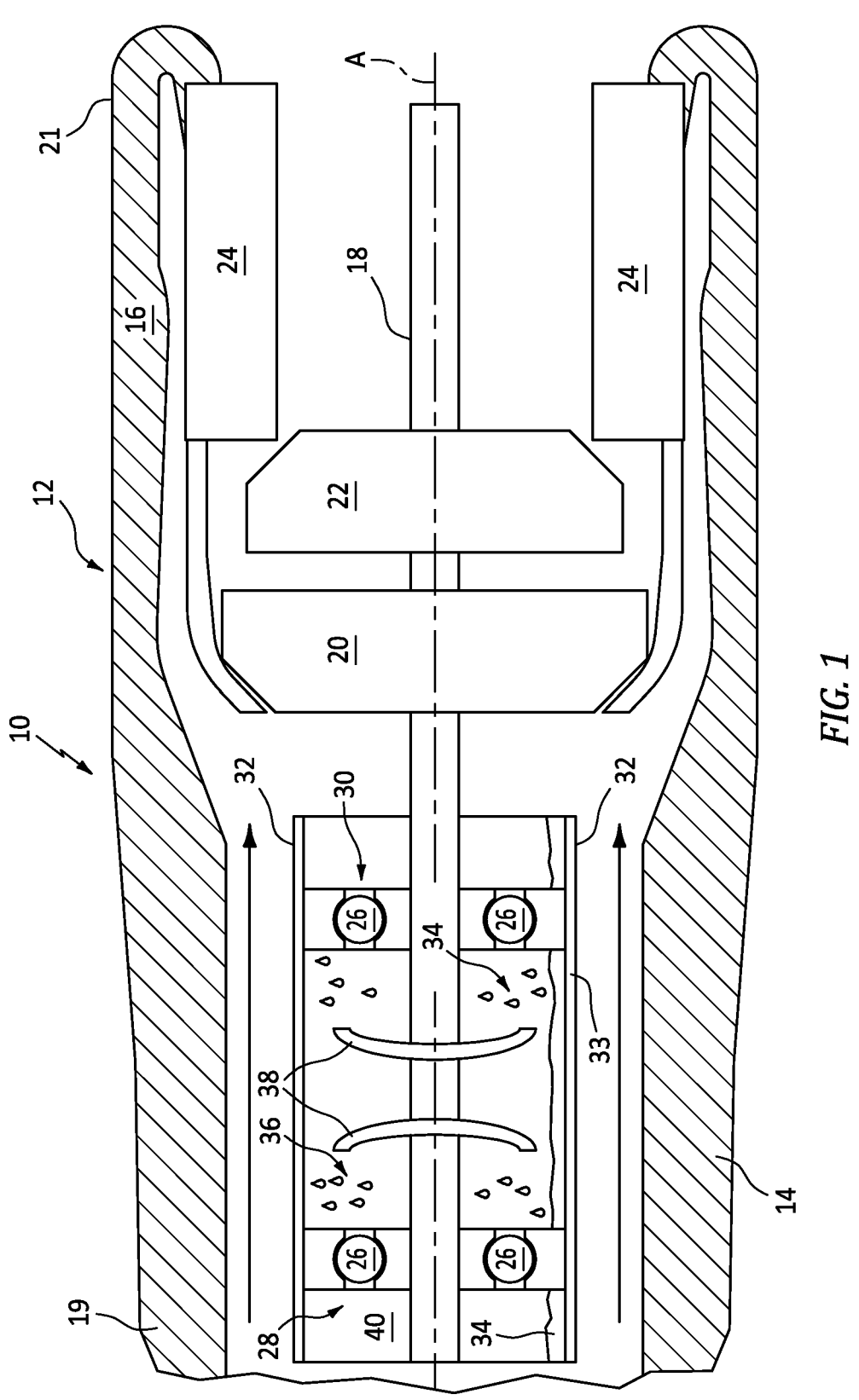
FIG. 1 is a schematic representation of an exemplary lubrication system associated with a gas turbine system in a vehicle.
Figure 2:
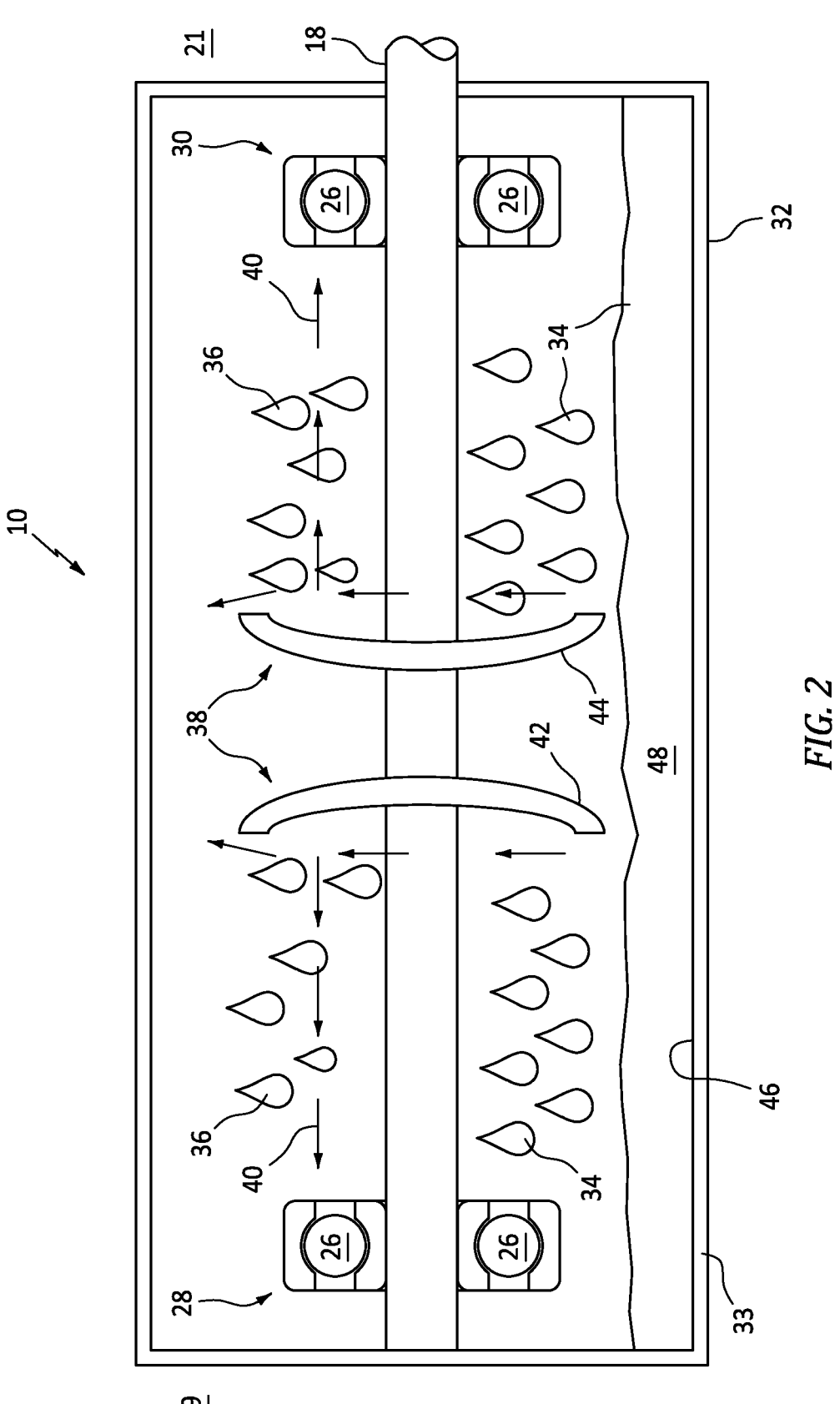
FIG. 2 is a schematic representation of the exemplary lubrication system of FIG. 1.

Referring now to FIG. 1 and FIG. 2, there is illustrated an exemplary lubrication system 10. The lubrication system 10 is associated with a gas turbine engine (turbo-jet) 12 installed in a vehicle 14, such as an unmanned or expendable vehicle. The gas turbine engine 12 includes a housing 16 supporting a shaft 18 aligned along an axis A. A forward portion 19 of the gas turbine engine 12 and an aft portion 21 of the gas turbine engine 12 are shown relative to the axis A. The gas turbine includes a compressor 20, a turbine 22 and combustor(s) 24. The compressor 20 and turbine 22 can be supported on the shaft 18.

The shaft 18 can be supported on bearings 26, such as first bearing 28 and second bearing 30. The first bearing 28 can be located axially forward of the second bearing 28 along the shaft 18. The bearings 26 can be located within a bearing compartment 32. The bearing compartment 32 includes a bearing compartment housing 33 that contains the bearings 26. The bearing compartment 32 can contain lubricant 34. The lubricant 34 can include liquid lubricant and lubricant mist 36, lubricant suspended in air as well as solid lubricant and semi-solid lubricant. The lubricant 34 can be an oil, a fuel, a grease and the like. The lubricant 34 can have a variety of viscosities. The lubricant 34 can be temperature dependent and change viscosity responsive to the temperature.

The lubrication system 10 can include a flinger 38. The flinger 38 can be in operative communication with the shaft 18 (e.g., coupled to, formed with, etc.). The flinger 38 can be configured to be rotated by the shaft 18. The flinger 38 can be integral with the shaft 18. The flinger 38 can be mounted to the shaft 18. The flinger 38 can include a scooped shape configured to cast the lubricant 34 into the air 40 within the bearing compartment housing 33.

The flinger 38 can be configured to propel the lubricant 34 in any phase or form, such as a liquid, a gas, a mixed phase fluid, and the like. The flinger 38 can be positioned to propel air 40 containing the lubricant 34. The flinger 38 can propel air 40, lubricant 34 and/or the mist 36 of lubricant 34/air 40. The flinger 38 can propel the lubricant 34 into contact with the bearings 26 to provide lubrication to the bearings 26. The flinger 38 can propel the lubricant 34 through the bearing compartment 32 from within the bearing compartment 32. The flinger 38 can be configured to maintain the lubricant 34/mist 40 to stay within the bearing compartment 32.

The exemplary embodiment shown in FIG. 1 and FIG. 2 incorporates a first flinger 42 and a second flinger 44. The first flinger 42 is configured to propel the air 40/mist 36, lubricant 34 into the first bearing 28 in a forward direction. The second flinger 44 is configured to propel the air 40/mist 36, lubricant 34 into the second bearing 30 in an aft direction. The first flinger 42 and second flinger 44 maintain the lubricant 34 in contact with the bearings 26.

Figures 3, 4, 5:
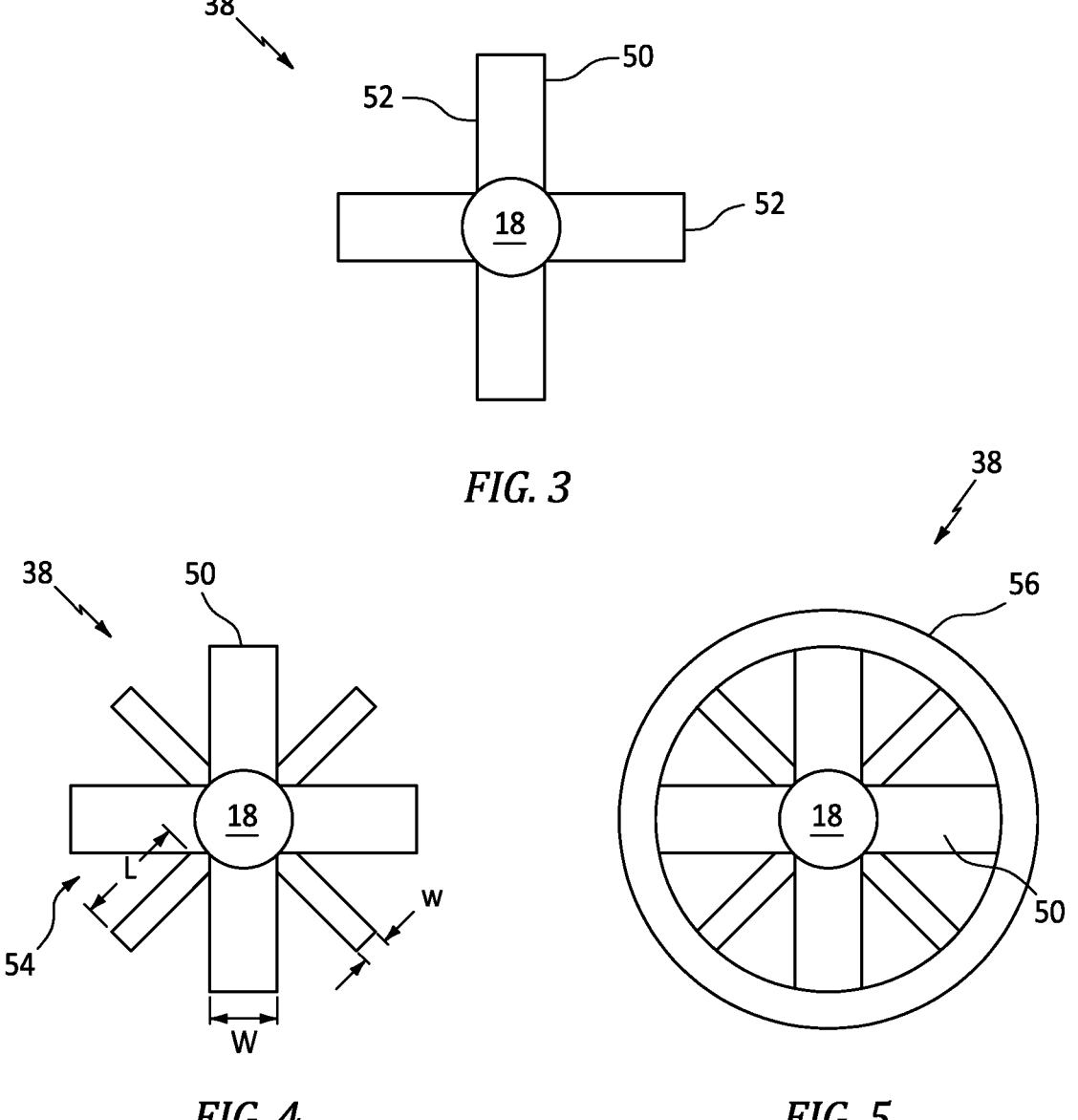
FIG. 3 is a front view schematic representation of an exemplary flinger.
FIG. 4 is a front view schematic representation of another exemplary flinger.
FIG. 5 is a front view schematic representation of yet another exemplary flinger.

Referring also to FIG. 3, FIG. 4, and FIG. 5, the flinger 38 can be configured with a parabolic curved shape, spoon shape, or underside of an airfoil shape. The flinger 38 can be configured with a scoop shape profile that can swirl the air 40 as well as the lubricant 34 and entrain the lubricant 34 into the air 40 to create a suspended lubricant 34 in the air 40, and/or mist 36 of lubricant 34 in the air 40. The flinger 38 shape is configured to contact the lubricant 34 pooled along an interior surface 46 of the bearing compartment housing 33. The lubricant 34 can form a boundary layer of lubricant film 48 proximate the interior surface 46.

FIG. 3, FIG. 4, and FIG. 5 are front views of the exemplary flinger 38. At FIG. 3, the flinger 38 can include arms 50 that can attach to the shaft 18. The arms 50 are shown as being opposing cross arms 52. The arms 50 are configured with four count. At FIG. 4, the flinger 38 can include a double cross configuration 54 with arms 50 offset to cover clockwise positions at 12, 2, 3, 5, 6, 8, 9, and 10. The arms 50 can have varying width dimensions W and length dimensions L. As seen in FIG. 5, the flinger 38 can be configured as a mobius design with an elliptical shaped hoop 56 at the distal ends 58 of each of the 8 arms 50.

A technical advantage of the disclosed lubrication system includes the elimination of a complex lubrication system.

Another technical advantage of the disclosed lubrication system includes weight reduction.

Another technical advantage of the disclosed lubrication system includes cost reduction.

Another technical advantage of the disclosed lubrication system includes improved efficiency of current engine systems.

Another technical advantage of the disclosed lubrication system includes fewer assembly pieces, simpler assembly.

Another technical advantage of the disclosed lubrication system includes elimination of on-board plumbing for oil delivery and return.

Another technical advantage of the disclosed lubrication system includes reduction of joining hardware for legacy lubrication systems, (less nuts and bolts for hardware attachment).

There has been provided a lubrication system. While the lubrication system has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A lubrication system comprising:
   a bearing compartment housing;
   a shaft supported by bearings located within the bearing compartment housing; and
   a flinger formed integral and monolithic with the shaft, the flinger configured to propel at least one of a lubricant, air and a mist of lubricant entrained in the air onto the bearing.

2. The lubrication system according to claim 1, wherein the flinger is configured as at least one arm with at least one of a parabolic curved shape, spoon shape, or underside of an airfoil shape.

3. The lubrication system according to claim 1, wherein the flinger comprises a scoop shape profile configured to swirl the air and the lubricant to entrain the lubricant in the air to create a suspended lubricant in the air, and/or mist of lubricant in the air.

4. The lubrication system according to claim 1, wherein the flinger is configured to propel the lubricant into contact with the bearings to lubricate the bearings.

5. The lubrication system according to claim 1, wherein the flinger comprises at least one arm in operative communication with the shaft.

6. The lubrication system according to claim 5, wherein the flinger arm is configured in at least one of a cross shape, a double cross shape, and a mobius shape.

7. A lubrication system comprising:
  a gas turbine engine having a gas turbine engine housing, the gas turbine engine housing having a forward portion opposite an aft portion;
  a shaft mounted within the gas turbine engine housing, the shaft having an axis;
  a bearing compartment housing formed within the gas turbine engine housing;
  at least one bearing located within the bearing compartment housing supports the shaft; and
  at least one flinger formed integral and monolithic with the shaft, the at least one flinger configured to propel at least one of a lubricant, air and a mist of lubricant entrained in the air onto the at least one bearing.

8. The lubrication system according to claim 7, wherein the at least one flinger is configured as at least one arm with at least one of a parabolic curved shape, spoon shape, or underside of an airfoil shape.

9. The lubrication system according to claim 8, wherein the at least one arm is configured in at least one of a cross shape, a double cross shape, and a mobius shape.

10. The lubrication system according to claim 7, wherein the at least one flinger is configured to propel the lubricant into contact with the bearings to lubricate the at least one bearing.

11. The lubrication system according to claim 7, wherein the at least one flinger shape is configured to contact the lubricant pooled along an interior surface of the bearing compartment housing.

12. A process for delivering a lubricant in a lubrication system comprising:
  mounting a shaft within a gas turbine engine housing of a gas turbine engine having a forward portion opposite an aft portion, the shaft having an axis extending from the forward portion to the aft portion;
  forming a bearing compartment housing within the gas turbine engine housing, the bearing compartment housing comprising an interior surface and an exterior surface, and the bearing compartment housing being configured to house at least one bearing configured to support the shaft;
  forming at least one flinger integral and monolithic with the shaft; and
  configuring the at least one flinger to propel at least one of a lubricant, air and a mist of lubricant entrained in the air onto the at least one bearing.

13. The process of claim 12, further comprising:
  configuring the at least one flinger as at least one arm with at least one of a parabolic curved shape, spoon shape, or underside of an airfoil shape.

14. The process of claim 13, further comprising:
  configuring the at least one arm in at least one of a cross shape, a double cross shape, and a mobius shape.

15. The process of claim 12, further comprising:
  configuring the flinger with a scoop shape profile configured to swirl the air and the lubricant to entrain the lubricant in the air to create a suspended lubricant in the air, and/or mist of lubricant in the air.

16. The process of claim 12, further comprising:
  configuring the at least one flinger to propel the lubricant in any phase or form, such as a liquid, a gas, a mixed phase fluid.

17. The process of claim 12, further comprising:
  configuring the at least one flinger shape to contact the lubricant pooled along an interior surface of the bearing compartment housing.

18. The process of claim 12, further comprising:
  forming a first flinger and a second flinger integral and monolithic with the shaft;
  configuring the first persuader to propel the lubricant in a forward direction onto a first bearing; and
  configuring the second flinger to propel the lubricant in an aft direction onto a second bearing.

* * * * *